ововlem
United States Patent
Takata et al.

(10) Patent No.: US 8,913,363 B2
(45) Date of Patent: Dec. 16, 2014

(54) OVERCURRENT PROTECTION CIRCUIT AND OVERCURRENT PROTECTION METHOD

(75) Inventors: Go Takata, Hyogo (JP); Yasunori Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 479 days.

(21) Appl. No.: 13/117,606

(22) Filed: May 27, 2011

(65) Prior Publication Data

US 2011/0291634 A1 Dec. 1, 2011

(30) Foreign Application Priority Data

May 28, 2010 (JP) .................................. 2010-123378
Mar. 10, 2011 (JP) .................................. 2011-053238

(51) Int. Cl.
*H02H 9/00* (2006.01)
*G05F 1/40* (2006.01)
*H02M 1/32* (2007.01)
*H02M 3/156* (2006.01)
*H02M 1/00* (2006.01)

(52) U.S. Cl.
CPC ............... *H02M 3/156* (2013.01); *H02M 1/32* (2013.01); *H02M 2001/0009* (2013.01)
USPC ........................................ 361/93.2; 323/282

(58) Field of Classification Search
USPC ............................................. 361/93.1, 93.2
See application file for complete search history.

(56) References Cited

U.S. PATENT DOCUMENTS

| 5,774,321 | A | 6/1998 | Kim et al. |
| 5,892,672 | A | 4/1999 | Preller |
| 6,788,128 | B2 * | 9/2004 | Tsuchida ...................... 327/427 |
| 7,358,685 | B2 | 4/2008 | Lee |
| 7,522,398 | B2 | 4/2009 | Tang |
| 7,593,245 | B2 | 9/2009 | Djenguerian et al. |
| 7,948,729 | B2 * | 5/2011 | Zhang et al. .................. 361/93.9 |
| 8,320,087 | B2 * | 11/2012 | Lin ................................. 361/18 |
| 2007/0008748 | A1 * | 1/2007 | Tang .......................... 363/21.12 |
| 2007/0008756 | A1 | 1/2007 | Djenguerian et al. |
| 2008/0297965 | A1 * | 12/2008 | Fang et al. .................... 361/93.1 |
| 2009/0296427 | A1 | 12/2009 | Djenguerian et al. |
| 2011/0019322 | A1 * | 1/2011 | Akama ......................... 361/93.1 |
| 2011/0051296 | A1 * | 3/2011 | Ando et al. .................... 361/18 |
| 2011/0188163 | A1 * | 8/2011 | Ando ............................. 361/57 |
| 2012/0162841 | A1 * | 6/2012 | Duan et al. .................... 361/79 |
| 2013/0193940 | A1 * | 8/2013 | Louvel ........................ 323/282 |
| 2014/0078629 | A1 * | 3/2014 | Cortigiani et al. ............. 361/79 |

FOREIGN PATENT DOCUMENTS

JP 2007-020393 1/2007

* cited by examiner

*Primary Examiner* — Rexford Barnie
*Assistant Examiner* — Angela Brooks
(74) *Attorney, Agent, or Firm* — McDermott Will & Emery LLP

(57) ABSTRACT

An overcurrent protection circuit includes: a determiner configured to determine whether or not the switch current exceeds a predetermined threshold, that is, the switch current is an overcurrent state when the switching element is turned ON; an OFF period setting counter configured to increase or decrease a counter output depending on a determination result of the determiner; and a drive signal generator configured to generate a drive signal of the switching element such that a length of an ON timing interval of the switching element corresponds to the counter output of the OFF period setting counter.

20 Claims, 6 Drawing Sheets

OVERCURRENT PROTECTION CIRCUIT AND OVERCURRENT PROTECTION METHOD

CROSS REFERENCE TO RELATED APPLICATION

The disclosures of Japanese Patent Applications No. 2010-123378 filed on May 28, 2010 and No. 2011-053238 filed on Mar. 10, 2011 each including a specification, drawings and claims are incorporated herein by reference in their entirety.

BACKGROUND OF THE INVENTION

1. Field of the Invention

The present invention relates to an overcurrent protection circuit and an overcurrent protection method, each of which prevents an overcurrent from flowing through a switching element.

2. Description of the Related Art

Generally, a switching control device, such as a switching power supply device, includes an overcurrent protection circuit for the purpose of protecting a switching element from destruction and deterioration. A general overcurrent protection method is a method for: detecting a current flowing through the switching element; when the detected current is higher than a predetermined threshold, determining that the current is an overcurrent state; and turning OFF the switching element. In such overcurrent protection circuit, false detection of the overcurrent may occur by a current flowing through a capacitance component, a noise, and the like at the time of switching of the switching element. To prevent such false detection, a predetermined period of time immediately after the switching is set as a period in which the detected current value is blanked out, that is, a so-called leading edge blanking period (hereinafter referred to as a "blanking period"). In a case where such blanking period is set, regardless of the detected current value, the switching element is definitely in an ON state during a minimum ON period including a delay time that is a time from when the blanking period terminates until when the switching element is actually turned OFF. Therefore, at the time of start-up or overload in which an output voltage of the switching power supply is low, in a case where the current flowing through the switching element increases during the minimum ON period, the current cannot be attenuated by turning OFF the switching element. On this account, the current may exceed a threshold of the overcurrent protection and keep on increasing for every minimum ON period, and this may cause the destruction and deterioration of the switching element. To solve such problems, for example, the overcurrent protection circuits described in Japanese Laid-Open Patent Application Publication No. 2007-20393 and U.S. Pat. No. 7,522,398 are known.

The overcurrent protection circuit disclosed in Japanese Laid-Open Patent Application Publication No. 2007-20393 will be briefly explained in reference to FIGS. 5 and 6. FIG. 5 is a schematic circuit diagram showing a flyback switching power supply device including a conventional overcurrent protection circuit. A power supply voltage VIN1 is connected to one end of a primary coil $901a$ of a switching transformer 901, and a current detector 930 and a switching element 920 are connected to the other end of the primary coil $901a$ in series. A capacitor 903 and a load 904 are connected to a secondary coil $901b$ of the switching transformer 901 via a diode 902 in parallel. An output voltage detector 905 detects an output voltage VOUT1. A current controller 950 performs ON-OFF control of the switching element 920 based on a detection result of the output voltage detector 905 such that the output voltage VOUT1 becomes a predetermined value. Moreover, in a case where the current detected by the current detector 930 exceeds the threshold, that is, the overcurrent state, the current controller 950 turns OFF the switching element 920, that is, performs overcurrent protection.

FIG. 6 is a schematic circuit diagram showing a configuration example of the current controller in the switching power supply device shown in FIG. 5. A gate drive signal DRIVE output from an RS flip-flop 959 to the switching element 920 is also input to a blanking pulse generator 960. The blanking pulse generator 960 generates a blanking signal BLANK after the switching element 920 is turned ON. The blanking signal BLANK contains a blanking pulse for setting a predetermined blanking period TBL1. A comparator 951 compares an output signal of the current detector 930 with a predetermined threshold ITH to determine whether or not the current flowing through the switching element 920 is the overcurrent state. An output of the comparator 951 is input to an AND gate 952 to which the blanking signal BLANK is input as the other input. Therefore, only in a period other than the blanking period, the comparator 951 can output a signal indicating that the current flowing through the switching element 920 is the overcurrent state. To be specific, since the output signal of the comparator 951 is blanked out during the blanking period, it is possible to prevent the false detection of the overcurrent caused due to a spike noise generated at the time of switching. When the signal level of an output signal OCU of the AND gate 952 becomes the H level, the RS flip-flop 959 is reset via an OR gate 958. With this, the switching element 920 is turned OFF, and this suppresses the overcurrent to the switching element 920.

Next, operations in the minimum ON period of the switching element 920 in the switching power supply device of the conventional example will be explained. Here, the minimum ON period of the switching element 920 is a period TMN1 obtained by adding a delay time TDL1 to the blanking period TBL1, the delay time TDL1 being a time from when the blanking period terminates until when the switching element 920 is actually turned OFF. When a minimum pulse detector 953 detects that the ON period of the switching element 920 has become the minimum ON period TMN1 for a predetermined number of times in a row, it sets a RS flip-flop 955 and switches the signal level of an output FAJD from the L level to the H level, the output FAJD being output to an oscillator 956. When the output FAJD to the oscillator 956 becomes the H level, the oscillator 956 lowers an oscillating frequency to delay the rising of the gate drive signal DRIVE (delay the ON operation of the switching element 920) by a predetermined time TDD1. When the signal level of the delayed gate drive signal DRIVE becomes the H level after the predetermined time TDD1, the RS flip-flop 955 is reset. Therefore, the oscillator 956 operates again at the oscillating frequency that is a frequency before the delay.

To be specific, in a case where the overcurrent protection circuit of the switching power supply device of the conventional example detects that the ON period of the switching element 920 has become the minimum ON period TMN1 for the predetermined number of times, it delays a switching cycle by the specific predetermined time TDD1. With this, a switching OFF period in which a switching current is attenuated is lengthened by the delay time TDD1. Therefore, even if the switching current continuously increases in the minimum ON period, it is possible to prevent the switching current from exceeding a current threshold and keeping on increasing.

Moreover, the overcurrent protection circuit disclosed in U.S. Pat. No. 7,522,398 is configured such that: in a normal operation, the switching element is repeatedly turned ON and OFF according to a predetermined cycle; the number of times the switching current flowing through the switching element has exceeded the current threshold is counted up; and the cycle of the turn-ON of the switching element is lengthened in accordance with the above number of times (the number of times the ON operation of the switching element is skipped at an ON timing of the switching element in the normal operation is increased). In such overcurrent protection circuit, when the switching current becomes the current threshold or lower, the switching element returns to the normal operation.

SUMMARY OF THE INVENTION

However, the overcurrent protection in the above conventional switching power supply devices has the following problems. To be specific, in the overcurrent protection in the conventional switching power supply device described in Japanese Laid-Open Patent Application Publication No. 2007-20393, the problem is that system adaptability with respect to various, changing load conditions is extremely low. For example, in a case where a predetermined delay period TDD1 with respect to a time constant of a switch current which increases in the minimum ON period is too short, the effect of suppressing the overcurrent becomes small, and the overcurrent protection function does not perform normally. Therefore, the destruction and deterioration of the switching element occur. In contrast, in a case where the predetermined delay period TDD1 with respect to the time constant of the switching current which increases in the minimum ON period is too long, electric power necessary to increase the output voltage VOUT1 up to a predetermined target value within a predetermined time cannot be adequately obtained at the time of the start-up or the like. Therefore, a decrease in start-up speed or a start-up failure occurs. As above, in the conventional switching power supply device, the delay time TDD1 needs to be timely adjusted depending on various conditions of the power supply.

Moreover, in a case where the ON timing of the switching element is skipped in accordance with the number of times the switching current has exceeded the current threshold as described in U.S. Pat. No. 7,522,398, even if the switching current can be decreased to the current threshold or lower by skipping the ON timing of the switching element, the switching power supply device returns to the normal operation (the ON timing of the switching element becomes the normal cycle) by decreasing the switching current to the current threshold or lower. Therefore, the switching current immediately exceeds the current threshold again, and the system is not stabilized.

Here, the present invention was made to solve the above problems, and an object of the present invention is to provide an overcurrent protection circuit and an overcurrent protection method, each of which is capable of surely and easily suppress an overcurrent over a wide load current range, the overcurrent flowing through a switching element.

In order to solve the above problems, an overcurrent protection circuit according to the present invention includes: a switching element configured to adjust electric power by switching control, the electric power being supplied to a load; a current detector configured to detect a switch current flowing through the switching element; and a controller configured to perform the switching control of the switching element based on the switch current detected by the current detector, wherein the controller includes: a determiner configured to determine whether or not the switch current exceeds a predetermined threshold, that is, the switch current is an overcurrent state when the switching element is turned ON; an OFF period setting counter configured to increase or decrease a counter output depending on a determination result of the determiner; and a drive signal generator configured to generate a drive signal of the switching element such that a length of an ON timing interval of the switching element corresponds to the counter output of the OFF period setting counter.

In accordance with this configuration, the history of the overcurrent detection is accumulated in the OFF period setting counter, and the ON timing (delay time) of the switching element is dynamically controlled in accordance with this history. Therefore, the switching can be performed at the optimal ON timing and the overcurrent can be surely and easily suppressed with respect to a wide range of load conditions. Further, the overcurrent can be surely suppressed even in the case of securing the long blanking period for preventing malfunctions caused due to a spike noise generated at the time of switching by a capacitance component or a charging current. Therefore, the system can be easily stabilized.

The determiner may determine by using the switch current flowing when a predetermined first period has passed since the switching element was turned ON. With this, it is possible to effectively prevent the malfunctions caused due to the spike noise generated at the time of switching.

The OFF period setting counter may be configured to count up the counter output when the determiner determines that the switch current is the overcurrent state and count down the counter output when the determiner determines that the switch current is not the overcurrent state. Further, the drive signal generator may be configured to lengthen the ON timing interval of the switching element as a value of the counter output increases and shorten the ON timing interval of the switching element as the value of the counter output decreases. With this, since the ON timing interval of the switching element properly changes depending on the history of the overcurrent detection, the ON timing of the switching element can be controlled with high accuracy.

The drive signal generator may generate a pulse width modulation signal based on an output voltage and generate the drive signal designed such that the ON timing interval of the switching element becomes the same in length as a cycle or cycles of the pulse width modulation signal, the number of cycles corresponding to a value of the counter output of the OFF period setting counter. The ON timing interval of the switching element is set to correspond to the cycle(s) of the pulse width modulation signal, and the periods in which the switching element is not turned ON are set, the number of periods corresponding to the number of cycles corresponding to the value of the counter output (the ON operation of the switching element is skipped certain times corresponding to the number of cycles). With this, the ON timing of the switching element can be controlled surely and easily.

The drive signal generator may generate the drive signal designed such that the switching element is not turned OFF regardless of the determination result of the determiner until a predetermined second period passes since the switching element is turned ON, and the first period may be set based on the second period. With this, the overcurrent can be suppressed while securing the blanking period for preventing the malfunctions caused due to the spike noise generated at the time of switching by the capacitance component or charging current.

The drive signal generator may be configured such that the ON timing interval of the switching element changes at an accelerated rate with respect to an increase/decrease range of a value of the counter output of the OFF period setting counter. With this, the timing interval of the switching element can be optimized quickly.

The determiner may be configured to change the threshold with time. With this, for example, at the time of the start-up, the threshold is gradually increased from a small predetermined initial value. Thus, the current flowing through the coil can be caused to follow the change in the threshold to be gradually increased. Therefore, this can be utilized as a soft start function for preventing the destruction of the coil and the switching element.

Moreover, an overcurrent protection method according to the present invention is an overcurrent protection method applied to a switching control device configured to supply electric power to a load and includes the steps of: (i) when a switching element configured to adjust, by switching control, the electric power supplied to the load is turned ON, determining whether or not a switch current flowing through the switching element exceeds a predetermined threshold, that is, the current is an overcurrent state; (ii) increasing or decreasing a counter output depending on a determination result of the step (i); and (iii) depending on an increase or decrease of the counter output, determining a period in which the switching element is OFF.

In accordance with the above method, the ON timing (delay time) of the switching element is dynamically controlled in accordance with the number of times it is determined that the current is the overcurrent state. Therefore, the switching can be performed at the optimal ON timing and the overcurrent can be surely and easily suppressed with respect to a wide range of load conditions. Further, the overcurrent can be surely suppressed even in the case of securing the long blanking period for preventing the malfunctions caused due to the spike noise generated at the time of switching by the capacitance component or charging current. Therefore, the system can be easily stabilized.

The step (i) may determine by using the switch current flowing when a predetermined first period has passed since the switching element was turned ON. With this, it is possible to effectively prevent the malfunctions caused due to the spike noise generated at the time of switching.

The step (iii) may include a step (iv) of generating a drive signal of the switching element, the drive signal being designed such that an ON timing interval of the switching element is lengthened as the number of times it is determined that the current is the overcurrent state increases. With this, since the ON timing interval of the switching element properly changes depending on the history of the overcurrent detection, the ON timing of the switching element can be controlled with high accuracy.

In the step (iv), the ON timing interval may be changed at an accelerated rate as the number of times it is determined that the current is the overcurrent state increases. With this, the timing interval of the switching element can be optimized quickly.

The present invention is configured as explained above, and the delay time of the switching is dynamically controlled in accordance with the history of the overcurrent detection. With this, the switching can be performed at the optimal ON timing and the overcurrent can be surely and easily suppressed with respect to a wide range of load conditions. Further, the overcurrent can be surely suppressed even in the case of securing the long blanking period for preventing the malfunctions caused due to the spike noise generated at the time of switching by the capacitance component or charging current. Therefore, the system can be easily stabilized.

The above object, other objects, features and advantages of the present invention will be made clear by the following detailed explanation of preferred embodiments with reference to the attached drawings.

DESCRIPTION OF THE PREFERRED EMBODIMENTS

Figure 1:
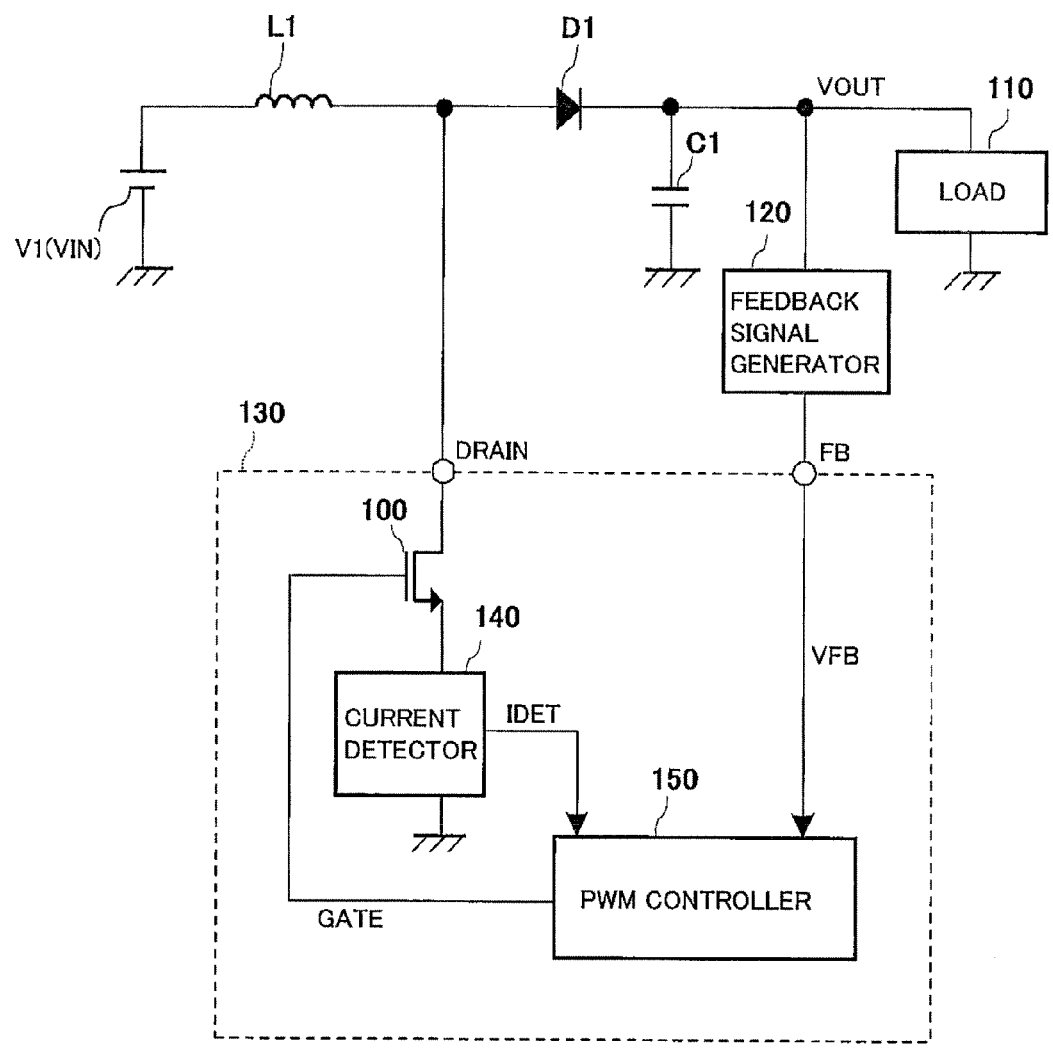
FIG. 1 is a schematic circuit diagram showing an entire configuration example of a switching power supply device to which an overcurrent protection circuit according to one embodiment of the present invention is applied.

Hereinafter, an embodiment of a switching power supply device to which an overcurrent protection circuit according to the present invention is applied will be explained in reference to the drawings. Hereinafter, the same reference signs are used for the same or corresponding components in the drawings, and a repetition of the same explanation is avoided.

The switching power supply device to which the overcurrent protection circuit according to one embodiment of the present invention is applied will be explained in reference to FIGS. 1 to 4. FIG. 1 is a schematic circuit diagram showing an entire configuration example of the switching power supply device to which the overcurrent protection circuit according to one embodiment of the present invention is applied. As shown in FIG. 1, the switching power supply device includes: a power supply (voltage source) V1 configured to generate a power supply voltage VIN; a coil L1 connected to the power supply V1 and configured to store electric power based on the power supply voltage VIN; a diode D1 connected to the coil L1; a capacitor C1 connected to the diode D1 and configured to generate an output voltage VOUT based on a current supplied through the diode D1, the output voltage VOUT being output to a load 110; a feedback signal generator 120 configured to generate a feedback signal based on the output voltage VOUT; a switching element 100 configured to switch weather to supply the electric power to the diode D1, the electric power being stored in the coil L1; a current detector 140 configured to detect a current flowing through the switching element 100; and a PWM controller 150 configured to control the switching element 100 based on the feedback signal and the current detected by the current detector 140. The switching power supply device constitutes a step-up DC-DC converter configured to drive the load 110 by the output voltage VOUT.

The power supply V1 has one end connected to ground and the other end connected to the coil L1, and supplies electric power to the coil L1. The coil L1 has the other end connected to the current detector 140 via the switching element 100. The current detector 140 has the other end connected to ground. An anode terminal of the diode D1 is connected to a contact point where the coil L1 and the switching element 100 contact each other. A cathode terminal of the diode D1 is connected to one end of the capacitor C1, and the other end of the capacitor C1 is connected to ground. The load 110 is connected to a contact point where the diode D1 and the capacitor C1 contact each other.

The switching element 100 is configured to be turned ON and OFF in accordance with a drive signal GATE transmitted from the below-described PWM controller. Specifically, the switching element 100 is constituted by a field-effect element. One (for example, a drain terminal) of two main terminals of the switching element 100 is connected to the coil L1, and the other main terminal (for example, a source terminal) is connected to ground via the current detector 140. Then, a gate terminal that is a control terminal of the switching element 100 is connected to the controller (PWM controller) 150. The drive signal GATE is input to the gate terminal of the switching element 100. The switching element 100 is turned ON when a signal (voltage) level of the drive signal GATE is a H level that is higher than a L level, and the switching element 100 is turned OFF when the signal level of the drive signal GATE is the L level. When the switching element 100 is in an ON state, the coil L1 stores the electric power based on the power supply voltage VIN. When the switching element 100 is in an OFF state, the electric power stored in the coil L1 is supplied through the diode D1 to the capacitor C1. To be specific, the switching power supply device of FIG. 1 is configured to perform so-called pulse width modulation (hereinafter referred to as "PWM") control, that is, to control the output voltage VOUT in accordance with a ratio (duty ratio) between the ON period and OFF period of the switching element 100, the output voltage VOUT being necessary to drive the load 110.

The feedback signal generator 120 generates a feedback signal VFB based on the output voltage VOUT and inputs the feedback signal VFB to the PWM controller 150. Moreover, the current detector 140 detects a current (switch current ISW) flowing through the switching element 100 and inputs a current detection signal IDET to the PWM controller 150. Based on the feedback signal VFB and the current detection signal IDET, the PWM controller 150 generates the drive signal GATE for driving the switching element 100. Then, the PWM controller 150 transmits the drive signal GATE to the switching element 100. Thus, the PWM controller 150 performs the ON-OFF control of the switching element 100 and controls the output voltage VOUT to an appropriate value. As above, the switching element 100, the current detector 140, and the PWM controller 150 constitute a feedback controller 130 configured to adjust electric power supplied based on the output voltage VOUT. In the present embodiment, the output voltage VOUT applied to the load 110 is fed back as the feedback signal VFB. However, the present embodiment is not limited to this as long as the feedback signal is a signal capable of directly or indirectly detecting a status of the electric power supplied to the load 110. For example, the current flowing to the load may be fed back, or a voltage or a current at a predetermined position connected to the load may be fed back.

Figure 2:
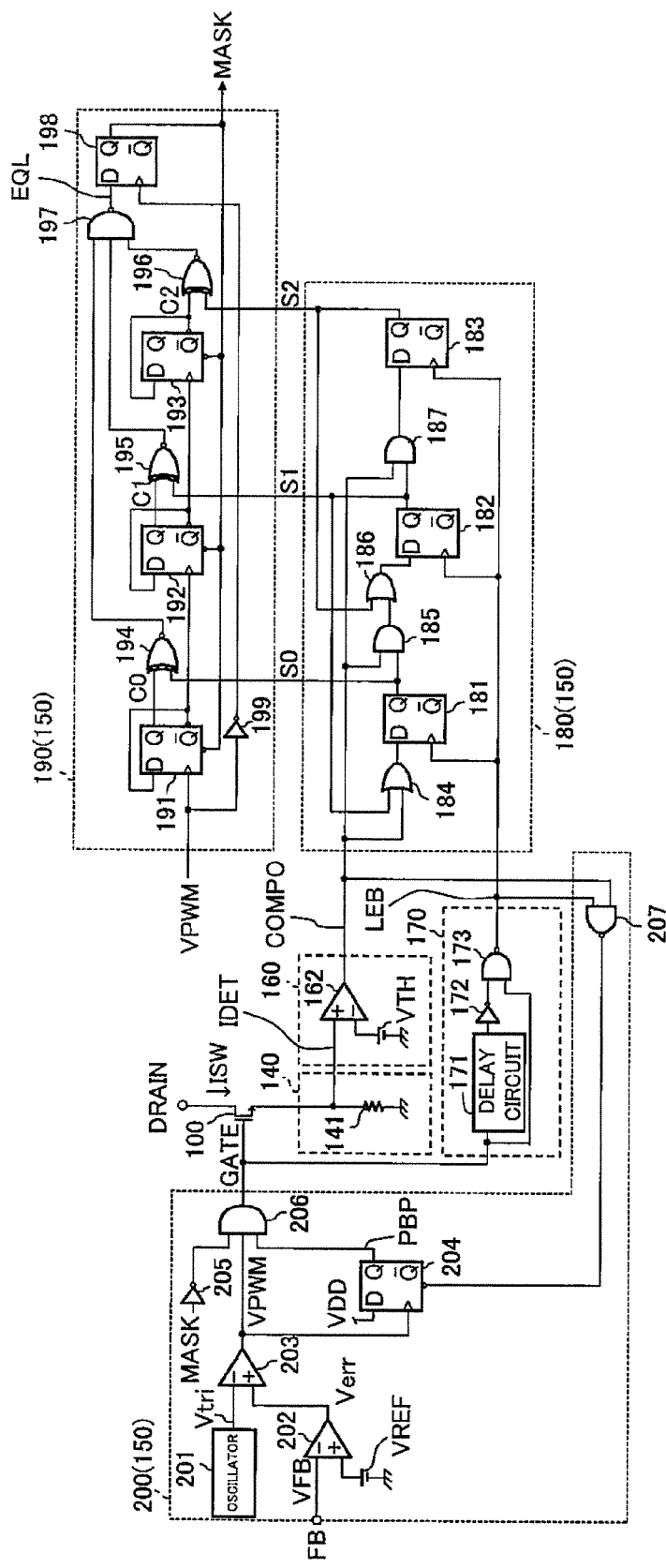
FIG. 2 is a circuit diagram showing a specific configuration example of a feedback controller of the switching power supply device shown in FIG. 1.

FIG. 2 is a schematic circuit diagram showing a specific configuration example of the feedback controller of the switching power supply device shown in FIG. 1.

As shown in FIG. 2, the current detector 140 includes a resistor 141 having one end connected to the source terminal of the switching element 100 and the other end connected to ground. The current detector 140 is configured to generate a detection current signal IDET obtained by converting the value of the current flowing through the switching element 100 into the value of the voltage at one end of the resistor 141 and input the detection current signal IDET to a comparator 160.

Moreover, the PWM controller 150 includes: the comparator 160 configured to compare a value of the detection current signal IDET (especially, a value of the detection current signal IDET when a predetermined first period has passed since the switching element 100 was turned ON) with a predetermined threshold (current limitation threshold VTH); a blanking pulse generator 170 configured to generate a blanking pulse signal LEB for blanking out the output of the comparator 160 in a predetermined second period (blanking period) from the rising of the drive signal GATE; an OFF period setting counter 180 configured to detect a rising edge of a pulse of the blanking pulse signal LEB to start operating; a mask signal generator 190 configured to generate a mask signal for blanking out a PWM signal VPWM in a predetermined period to turn OFF the switching element 100 when the comparator 160 determines that the current is an overcurrent state; and a drive signal generator 200 configured to generate the drive signal GATE of the switching element 100 such that the length of an ON timing interval Tg of the switching element 100 corresponds to a counter output of the OFF period setting counter 180.

The comparator 160 includes a comparator 162 and compares the current detection signal IDET with the current limitation threshold VTH. The comparator 160 outputs a comparison signal COMPO whose signal level becomes the H level, higher than the L level, when the current detection signal IDET exceeds the current limitation threshold VTH. Therefore, the comparator 160 in the present embodiment serves as a determiner configured to determine whether or not the switching element 100 is in an overcurrent state in which the switch current flowing through the switching element 100 exceeds a predetermined threshold.

The blanking pulse generator 170 delays the drive signal GATE by a blanking period Tbk by a delay circuit 171 and generates and outputs the blanking pulse signal LEB whose signal level is maintained at the L level during the blanking period Tbk from the timing of the rising (which denotes that the signal level changes from the L level to the H level) of the drive signal GATE. Specifically, the drive signal GATE is input to the blanking pulse generator 170, delayed by the delay circuit 171, and inverted by an inverter 172. Such drive signal GATE is input to a NAND gate 173, and the NAND gate 173 outputs the blanking pulse signal LEB. The blanking period Tbk is a period in which the comparison signal COMPO is blanked out to remove influences of, for example, a spike noise generated at the time of switching.

The OFF period setting counter 180 is an up-down counter configured to detect the rising edge of the pulse of the blanking pulse signal LEB to start operating. The OFF period setting counter 180 in the present embodiment is constituted by a 3-bit up-down counter.

Specifically, the OFF period setting counter 180 is configured such that the counter output changes depending on the determination result of the comparator 160 that is the determiner. Specifically, the OFF period setting counter 180 includes (three) latch circuits 181 to 183, the number of which corresponds the number of bits. The blanking pulse signal LEB output from the blanking pulse generator 170 is input to each clock input of the OFF period setting counter 180. The comparison signal COMPO output from the comparator 160 and an output S1 of the latch circuit 182 of the second stage are input to an OR gate 184, and an OR output of the OR gate 184 is input to a data input of the latch circuit 181 of the first stage. The comparison signal COMPO and an output S0 of the latch circuit 181 of the first stage are input to an AND gate 185. An AND output of the AND gate 185 and an output S2 of the latch circuit 183 of the third stage are input to an OR gate 186, and an OR output of the OR gate 186 is input to a data input of the latch circuit 182 of the second stage. The comparison signal COMPO and the output S1 of the latch circuit 182 of the second stage are input to an AND gate 187, and an AND output of the AND gate 187 is input to a data input of the latch circuit 183 of the third stage.

With this, when the signal level of the comparison signal COMPO is the H level at the timing of the rising edge of the pulse of the blanking pulse signal LEB (at the time when the signal level of the blanking pulse signal LEB changes from the L level to the H level), a counter output S[2:0] (S0 to S2) is counted up. When the signal level of the comparison signal COMPO is the L level at the timing of the rising edge of the pulse of the blanking pulse signal LEB, the counter output S[2:0] is counted down. To be specific, the OFF period setting counter 180 is configured to count up the counter output S[2:0] in a case where the current flowing through the switching element 100 at the time of the termination of the blanking period (first period=second period) is higher than the current limitation threshold and count down the counter output S[2:0] in a case where the current flowing through the switching element 100 at the time of the termination of the blanking period is not higher than the current limitation threshold. In summary, the OFF period setting counter 180 is configured to count up the counter output S[2:0] in a case where the comparator 160 serving as the determiner determines that the current is the overcurrent state and count down the counter output S[2:0] in a case where the determiner determines that the current is not the overcurrent state. This counter output S[2:0] is input to the mask signal generator 190.

The OFF period setting counter 180 of the present embodiment is configured such that the counter output S[2:0] increases and decreases at unequal intervals. Specifically, when the counter output S[2:0] is counted up, it increases at an accelerated rate so as to become 0→1→3→7 (000→001→011→111) at unequal intervals. Moreover, when the counter output S[2:0] is counted down, it decreases so as to become 7→3→1→0 (111→011→001→000) at unequal intervals. The OFF period setting counter 180 may be configured to increase and decrease the counter output S[2:0] at regular intervals or may be configured such that the amount of change in the counter output S[2:0] differs between when the counter output S[2:0] is increasing and when the counter output S[2:0] is decreasing. The configuration of the OFF period setting counter 180 is not limited to the above as long as the counter output S[2:0] increases and decreases in accordance with the history of current detection results.

The mask signal generator 190 includes an up counter configured to start operating at the rising edge of the PWM signal VPWM generated by the drive signal generator 200. The up counter of the mask signal generator 190 is a 3-bit up counter corresponding to the OFF period setting counter 180 and outputs a counter output C[2:0].

Specifically, the mask signal generator 190 includes (three) latch circuits 191 to 193, the number of which corresponds to the number of bits and each of which includes a reset terminal. An inverted output of the latch circuit is input to its own data input. Moreover, the PWM signal VPWM is input to a clock input of the latch circuit 191 of the first stage, the inverted output of the latch circuit 191 of the first stage is input to a clock input of the latch circuit 192 of the second stage, and the inverted output of the latch circuit 192 of the second stage is input to a clock input of the latch circuit 193 of the third stage. The mask signal generator 190 further includes: a XNOR gate 194 to which a counter output C0 of the latch circuit 191 of the first stage and a counter output S0 of the first stage of the OFF period setting counter 180 are input; a XNOR gate 195 to which a counter output C1 of the latch circuit 192 of the second stage and a counter output S1 of the second stage of the OFF period setting counter 180 are input; a XNOR gate 196 to which a counter output C2 of the latch circuit 193 of the third stage and a counter output S2 of the third stage of the OFF period setting counter 180 are input; a NAND gate 197 to which XNOR outputs of the XNOR gates 194 to 196 are input; and a latch circuit 198 having a data input to which a NAND output (below-described coinciding signal EQL) of the NAND gate 197 is input and a clock input to which an inverted signal of the PWM signal VPWM is input through an inverter 199.

With this, the mask signal generator 190 generates the coinciding signal EQL whose signal level becomes the L level when the signal level of the counter output S[2:0] of the OFF period setting counter 180 and the signal level of the counter output C[2:0] of the mask signal generator 190 coincide with each other and whose signal level becomes the H level, higher than the L level, when the signal level of the counter output S[2:0] of the OFF period setting counter 180 and the signal level of the counter output C[2:0] of the mask signal generator 190 do not coincide with each other. Further, when the coinciding signal EQL is input to the data input of the latch circuit 198, and the inverted signal of the PWM signal VPWM is input to the clock input of the latch circuit 198, a mask signal MASK is output from an output Q of the latch circuit 198. To be specific, the mask signal generator 190 generates the mask signal MASK based on the PWM signal VPWM and the counter output S[2:0] of the OFF period setting counter 180.

As described below, the mask signal MASK is input to the drive signal generator 200. The mask signal MASK is used to blank out the PWM signal VPWM for a predetermined period and turn OFF the switching element 100 when it is detected that the current flowing through the switching element 100 is the overcurrent state.

The drive signal generator 200 is configured to generate the drive signal GATE designed to: turn OFF the switching element 100 when the comparator 160 determines that the current is the overcurrent state; lengthen the ON timing interval Tg of the switching element 100 as the value of the counter output of the OFF period setting counter 180 increases; and shorten the ON timing interval Tg of the switching element 100 as the value of the counter output of the OFF period setting counter 180 decreases. Specifically, the drive signal generator 200 includes: an oscillator 201; an error amplifier 202 configured to amplify a difference between a voltage of the feedback signal VFB and a reference voltage VREF; a comparator 203 configured to compare an output signal Vtri output from the oscillator 201 and an error signal Verr amplified by the error amplifier 202 to output the PWM signal VPWM; a latch circuit 204 configured to output a power supply voltage VDD based on the PWM signal VPWM; an inverter 205 configured to invert the mask signal MASK generated by the mask signal generator 190; an AND gate 206 to which the PWM signal VPWM, the inverted signal of the mask signal MASK, and an output signal PBP of the latch circuit 204 are input; and a NAND gate 207 configured to receive the comparison signal COMPO from the comparator 160 and the blanking pulse signal LEB from the blanking pulse generator 170 and output a NAND output to a reset input of the latch circuit 204.

The oscillator 201 generates the output signal Vtri having a predetermined frequency and a sawtooth waveform and outputs the output signal Vtri to an inverting input terminal of the comparator 203. The error amplifier 202 generates the error signal Verr by amplifying a difference voltage obtained by subtracting the voltage of the feedback signal VFB from the reference voltage VREF. Then, the error amplifier 202 outputs the error signal Verr to a non-inverting input terminal of the comparator 203. The comparator 203 compares the error signal Verr with the output signal Vtri of the oscillator 201 to generate the PWM signal VPWM that is a control signal for controlling the switching element 100. Then, the drive signal GATE is output to the gate terminal of the switching element 100 through the AND gate 206.

The AND gate 206 is provided between the output terminal of the PWM signal VPWM and the gate terminal of the switching element 100. By inputting the inverted signal of the mask signal MASK to the AND gate 206, the AND gate 206 generates the drive signal GATE designed such that the ON timing interval Tg of the switching element 100 corresponds to the length of the cycle(s) of the PWM signal VPWM, the number of cycles corresponding to the value of the counter output S[2:0] of the OFF period setting counter 180.

The comparison signal COMPO and the blanking pulse signal LEB are input to the NAND gate 207, and the NAND gate 207 outputs a NAND output as a reset signal of the latch circuit 204 based on the signals COMPO and LEB. To be specific, the drive signal generator 200 is configured to generate the drive signal GATE designed such that until the blanking period Tbk passes since the switching element 100 is turned ON, the switching element 100 is not turned OFF regardless of the determination result of the comparator 160 that is the determiner. Moreover, the latch circuit 204 outputs the power supply voltage VDD as the output signal PBP based on the PWM signal VPWM input to the clock input thereof, the power supply voltage VDD being input to the data input thereof.

The AND gate 206 generates the drive signal GATE which becomes the H level when all of the PWM signal VPWM, the output signal PBP of the latch circuit 204, and the inverted signal of the mask signal MASK are the H levels. Then, the AND gate 206 outputs such drive signal GATE to the gate terminal of the switching element 100.

Here, a current limiting operation performed when the overcurrent that is a predetermined threshold or higher has flowed through the switching element 100 will be explained. First, in a period in which the signal level of the blanking pulse signal LEB is the H level (after a period in which the comparison signal COMPO is blanked out has passed), if the current flowing through the switching element 100 increases and the signal level (voltage value) of the current detection signal IDET becomes the current limitation threshold VTH or higher, the signal level of the comparison signal COMPO becomes the H level. Therefore, the latch circuit 204 is reset, and the signal level of the output signal PBP of the latch circuit 204 becomes the L level. As a result, the signal level of the drive signal GATE that is the output of the AND gate 206 forcibly becomes the L level, and the switching element 100 is turned OFF. Then, the OFF state of the switching element 100 continues until the next rising edge of the PWM signal VPWM. When the next rising edge of the PWM signal VPWM is input to the latch circuit 204, the signal level of the output signal PBP of the latch circuit 204 returns to the H level, and the switching element 100 becomes the ON state. As above, so-called Pulse-by-Pulse current limitation acts on the switching element 100.

Figure 3:
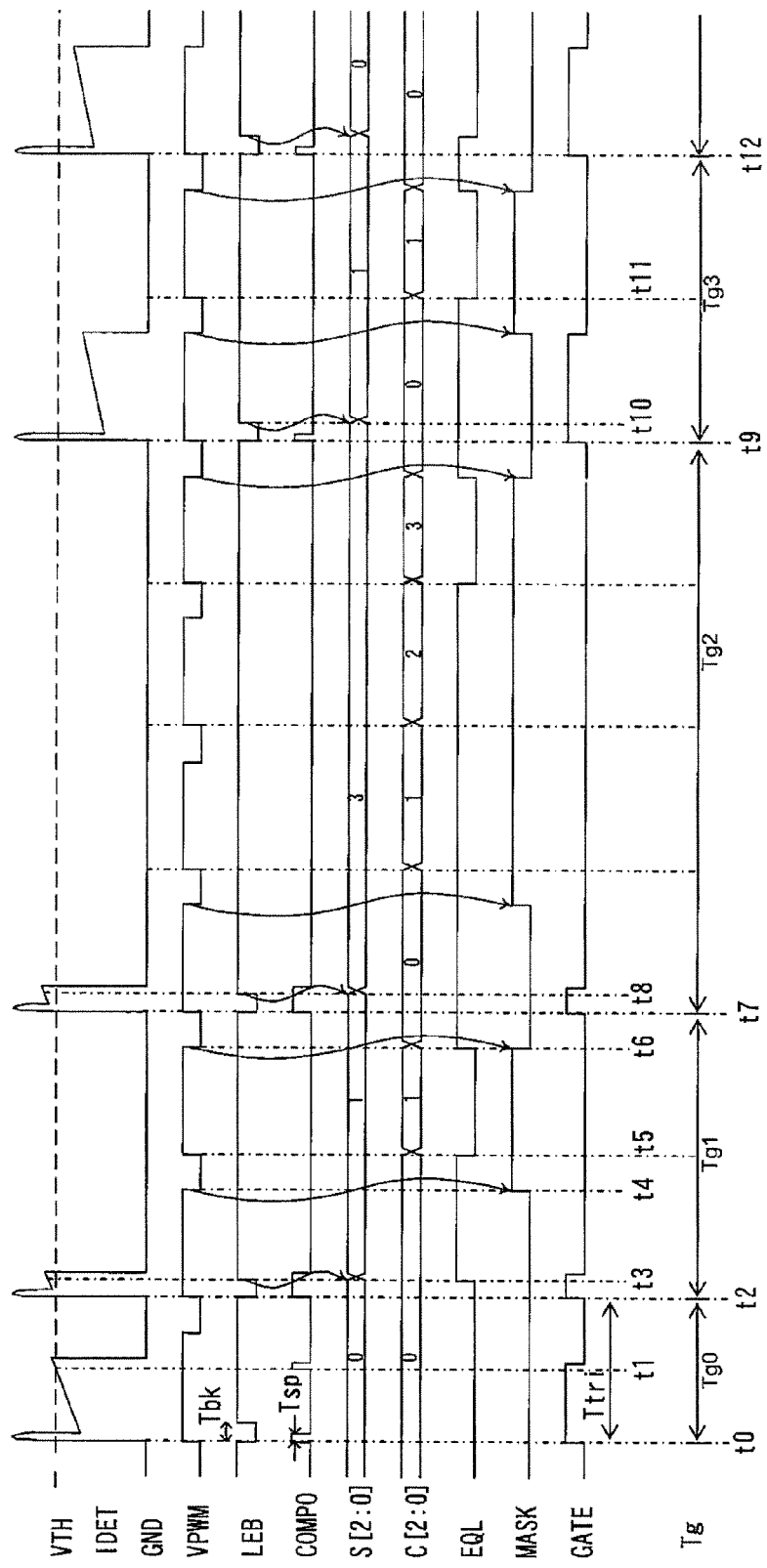
FIG. 3 is a timing chart showing one example of operations of the feedback controller shown in FIG. 2.

Hereinafter, the operations of the feedback controller 130 shown in FIG. 2 will be explained in detail in reference to FIG. 3. FIG. 3 is a timing chart showing one example of the operations of the feedback controller shown in FIG. 2. In FIG. 3, a cycle Ttri of the PWM signal VPWM is equal to a cycle of the output signal Vtri (not shown) of the oscillator 201.

At a time point t0, the signal level of the PWM signal VPWM becomes the H level, and the signal level of the drive signal GATE becomes the H level. With this, the switching element 100 is turned ON. Thus, a voltage equal to or higher than a ground voltage is detected as the current detection signal IDET. After a spike switching noise is generated with respect to the current detection signal IDET by the ON operation of the switching element 100, the current detection signal IDET increases while inclining due to the coil L1. Since the signal level of the current detection signal IDET becomes higher than the current limitation threshold VTH by the influence of this switching noise, the signal level of the comparison signal COMPO of the comparator 160 becomes the H level only in a short period Tsp. In this case, the signal level of the blanking pulse signal LEB becomes the L level only in the blanking period Tbk from the rising of the PWM signal VPWM. Therefore, in the blanking period Tbk, the comparison signal COMPO is blanked out in the Pulse-by-Pulse current limiting operation, and the signal level of the drive signal GATE maintains the H level.

At a time point t1, the current detection signal IDET becomes the current limitation threshold VTH or higher. With this, the signal level of the comparison signal COMPO becomes the H level, and the latch circuit 204 is reset. Therefore, the signal level of the drive signal GATE becomes the L level. As a result, the switch current ISW flowing through the switching element 100 is blocked based on a predetermined threshold.

At a time point t2, the signal level of the PWM signal VPWM becomes the H level again. With this, the next switching cycle starts, and the switching element 100 is turned ON. At this time, an ON timing interval Tg0 (t2-t0) of the switching element 100 in the first cycle of the drive signal GATE becomes the same in length as one cycle of the PWM signal VPWM.

If the signal level of the current detection signal IDET has already exceeded the current limitation threshold VTH at the time of the termination of the blanking period shown as a time point t3, the latch circuit 204 is reset, and the switching element 100 is turned OFF. At this time, at the rising edge of the blanking pulse signal LEB, the counter output S[2:0] of the OFF period setting counter 180 is counted up from 0 to 1. At this time, since the counter output S[2:0] of the OFF period setting counter 180 does not coincide with the counter output C[2:0] of the mask signal generator 190, the signal level of the coinciding signal EQL becomes the H level.

Then, at a time point t4, the PWM signal VPWM falls (the signal level changes from the H level to the L level). Here, since the signal level of the coinciding signal EQL is the H level, the signal level of the mask signal MASK becomes the H level. Since the signal level of the mask signal MASK becomes the H level, the counter output C[2:0] of the mask signal generator 190 becomes an enable state, and the signal level of the drive signal GATE forcibly becomes the L level (Actually, the switching element 100 does not change its state since it is already in the OFF state at the time point t4).

Then, at a time point t5, the next PWM cycle starts. Here, normally, the signal level of the PWM signal VPWM becomes the H level, and therefore, the signal level of the drive signal GATE becomes the H level. However, since the signal level of the mask signal MASK is the H level, the signal level of the drive signal GATE maintains the L level. To be specific, one PWM operation (one cycle) of the switching element 100 is skipped. Moreover, at the rising edge of the PWM signal VPWM, the counter output C[2:0] of the mask signal generator 190 is counted up to coincide with the counter output S[2:0] of the OFF period setting counter 180, and the signal level of the coinciding signal EQL becomes the L level.

At a time point t6, the PWM signal VPWM falls. Here, since the signal level of the coinciding signal EQL is the L level, the signal level of the mask signal MASK becomes the L level. With this, the counter output C[2:0] of the mask signal generator 190 is reset and does not coincide with the counter output S[2:0] of the OFF period setting counter 180. Therefore, the signal level of the coinciding signal EQL becomes the H level.

At a time point t7, the next PWM cycle starts. Here, since the forcible limitation of the drive signal GATE by the mask signal MASK is canceled, the signal level of the drive signal GATE becomes the H level in accordance with the rising of the PWM signal VPWM, and the switching element 100 is turned ON again. At this time, an ON timing interval Tg1 (t7-t2) of the switching element 100 in the second cycle of the drive signal GATE becomes the same in length as two cycles of the PWM signal VPWM.

At a time point t8, the signal level of the comparison signal COMPO at the time of the termination of the blanking period in this cycle is the H level again. In this case, the counter output S[2:0] of the OFF period setting counter 180 is counted up from 1 to 3. Three PWM operations (three cycles) of the switching element 100 are skipped by operations that are the same as the operations performed from the time point t3 until the time point t7. To be specific, the PWM operations, the number of which corresponds to a value n of the counter output of the OFF period setting counter 180, are skipped. At a time point t9, the next PWM cycle starts. Here, the switching element 100 is turned ON again. At this time, an ON timing interval Tg2 (t9-t7) of the switching element 100 in the third cycle of the drive signal GATE becomes the same in length as four cycles of the PWM signal VPWM.

Then, at a time point t10, the blanking period Tbk terminates. Here, a coil current is adequately attenuated by the skipping of the previous three PWM operations. Thus, the signal level of the current detection signal IDET is lower than the current limitation threshold VTH. In this case, at the rising edge of the blanking pulse signal LEB, the counter output S[2:0] of the OFF period setting counter 180 is counted down. Then, when the PWM signal VPWM falls, the signal level of the mask signal MASK becomes the H level.

At a time point t11, the next PWM cycle starts. Here, the signal level of the mask signal MASK is the H level, and the value of the counter output S[2:0] of the OFF period setting counter 180 is 1. Therefore, the switching element 100 is not turned ON, and one PWM operation is skipped. Then, at a time point t12, the next PWM cycle starts. Here, the switching element 100 is turned ON again. At this time, an ON timing interval Tg3 (t12-t9) of the switching element 100 in the fourth cycle of the drive signal GATE becomes the same in length as two cycles of the PWM signal VPWM.

The above operations are summarized below. In the switching power supply device of the present embodiment, in a case where it is detected that the switch current ISW is already the overcurrent state at the time of the termination of the blanking period Tbk in a predetermined PWM cycle, the switching operation is skipped in the next and subsequent PWM cycles. In addition, the number of times the switching operation is skipped is not a certain number of times but depends on the value of the counter output S[2:0] of the OFF period setting counter. To be specific, the number of times the switching operation is skipped is set depending on the history of the overcurrent limitation operation (the number of times of operations) in the previous PWM cycles. Therefore, the duty ratio of the pulse voltage applied to the load 110 in the following cycles is controlled depending on the history of the overcurrent limitation operation.

As above, the ON timing interval Tg of the switching element 100 is set to correspond to the cycle(s) of the PWM signal VPWM, and the periods in which the switching element 100 is not turned ON are set, the number of periods corresponding to the number of cycles corresponding to the value of the counter output S[2:0] of the OFF period setting counter 180 (the ON state of the switching element 100 is skipped certain times corresponding to the above number of cycles). With this, the ON timing interval of the switching element properly changes depending on the history of the overcurrent detection. Therefore, the ON timing of the switching element 100 can be surely and easily controlled.

Moreover, as described above, the drive signal generator 200 is configured such that the ON timing interval Tg of the switching element 100 changes at an accelerated rate with respect to an increase/decrease range of the value of the counter output S[2:0] of the OFF period setting counter 180. To be specific, if the counter output S[2:0] increase (or decrease) by one level, the timing interval Tg is lengthened (or shortened) by n cycle(s) of the PWM signal VPWM. With this, the timing interval Tg of the switching element 100 can be optimized quickly. In the present embodiment, as described above, the value of the counter output S[2:0] changes at an accelerated rate when the counter output S[2:0] is increased (or decreased) by one level, and the ON state is skipped by the cycles, the number of which corresponds the value n of the counter output S[2:0]. However, for example, the value of the counter output S[2:0] may be increased or decreased one by one each time it is determined that the current is the overcurrent state, and the ON timing interval Tg of the switching element 100 may change at an accelerated rate with respect to the increase or decrease of the value of the counter output S[2:0].

The foregoing has explained an example in which in the switching power supply device of the present embodiment, the number of times the PWM operation is skipped is controlled by determining whether or not the magnitude of the switch current ISW at the time of the termination of the blanking period Tbk is a predetermined threshold or more (an example in which the first period is equal to the second period). However, the timing of the determination does not have to be the same as the termination of the blanking period Tbk, and the first period may be set based on the second period or may be set in a totally different way. For example, the first period may be shorter than the second period as long as the influence of the switching noise is ignorable. The timing of the determination is not limited to the above as long as it is possible to determine that when the next PWM cycle has started, the switching element 100 is already in the overcurrent state or the switching element 100 is almost in the overcurrent state.

Moreover, in the switching power supply device of the present embodiment, the value of the current limitation threshold VTH in the comparator 160 is a fixed voltage but may be a variable voltage. To be specific, the comparator 160 serving as the determiner may be configured to change the current limitation threshold VTH with time. For example, at the time of the start-up, the current limitation threshold VTH is gradually increased from a small predetermined initial value VTH0. With this, the current flowing through the coil L1 can be caused to follow the change in the current limitation threshold VTH to be gradually increased. Therefore, this can be utilized as a soft start function for preventing the destruction of the coil L1 and the switching element 100.

Figure 5:
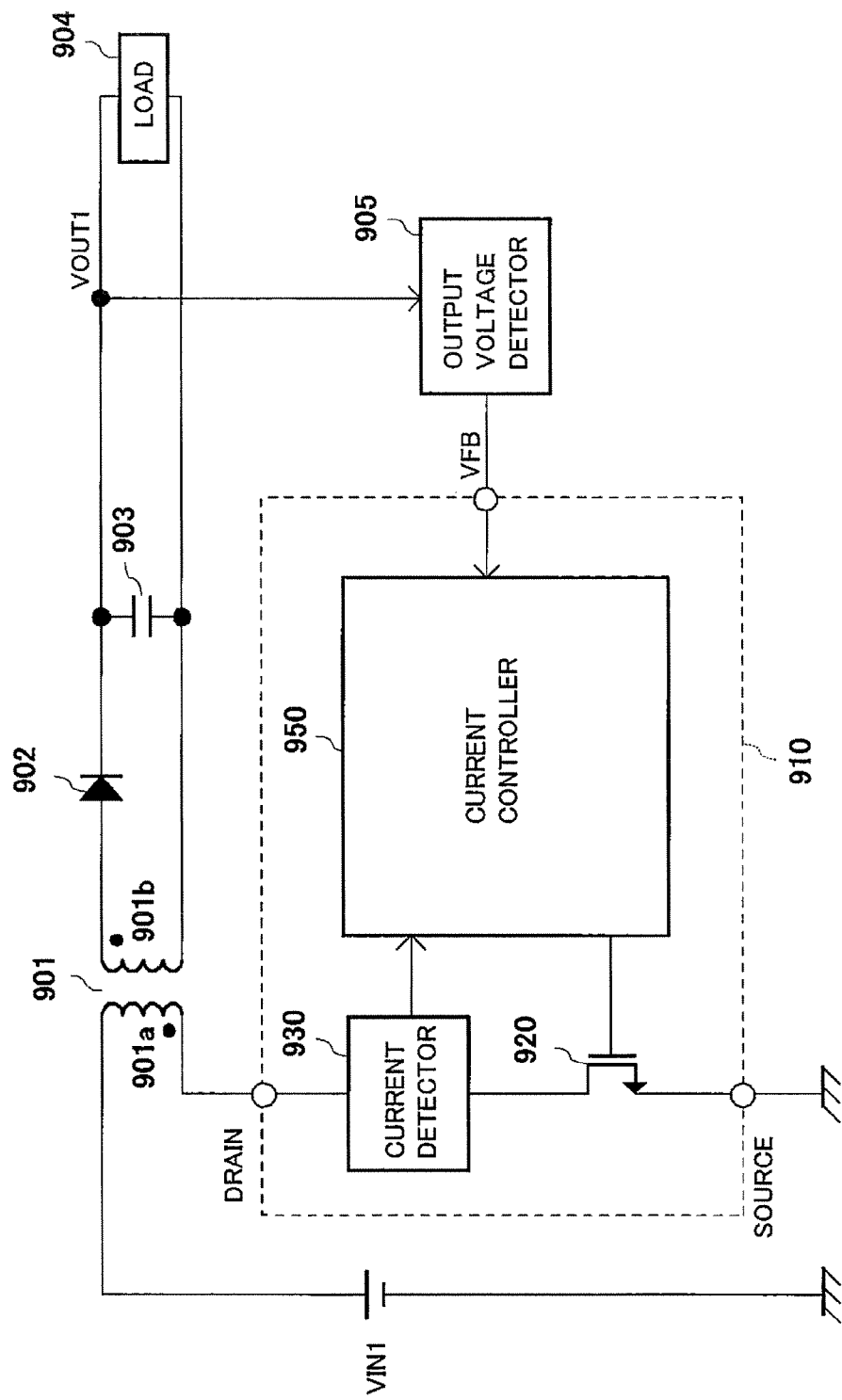
FIG. 5 is a schematic circuit diagram showing a flyback switching power supply device including a conventional overcurrent protection circuit.
Figure 6:
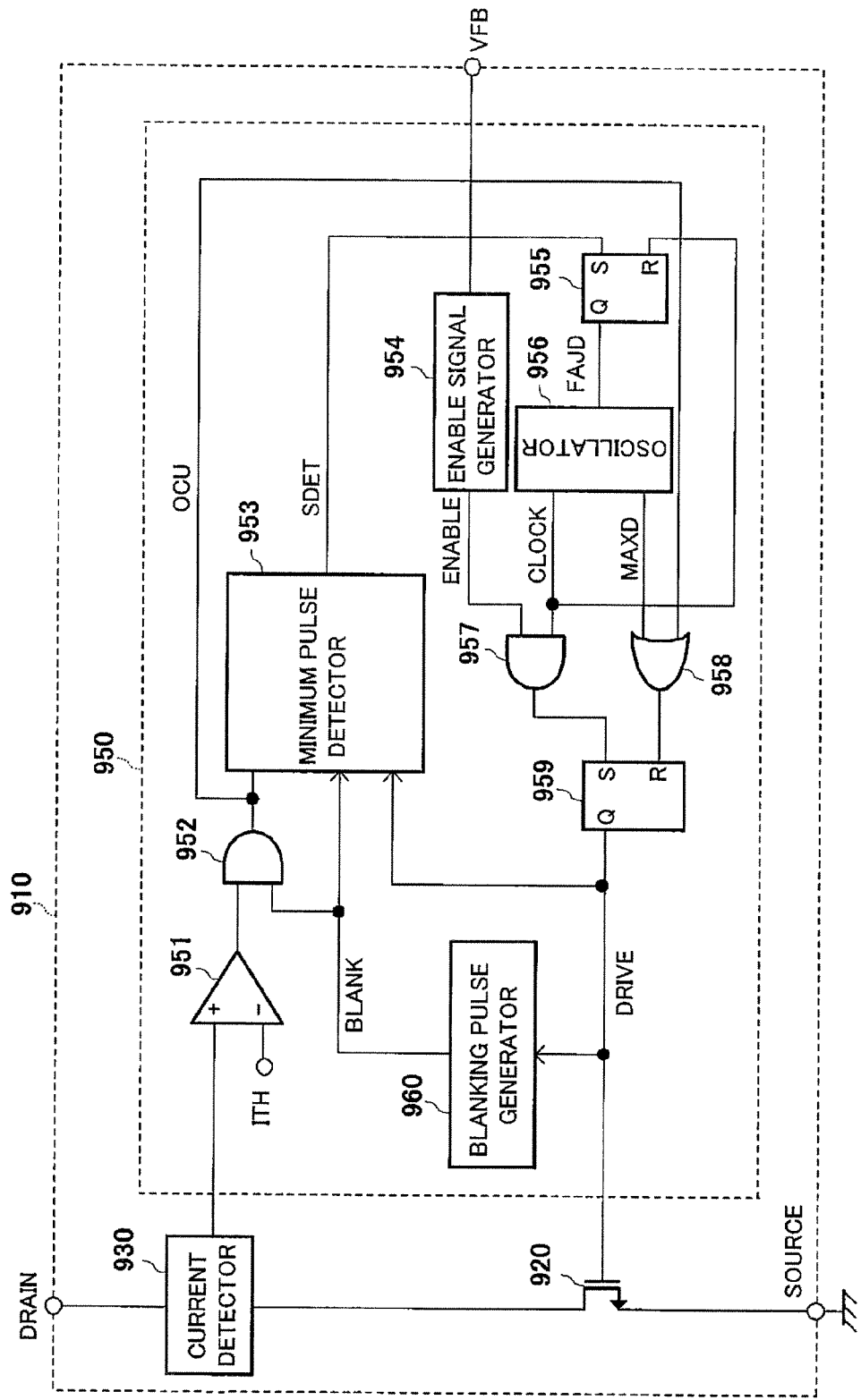
FIG. 6 is a schematic circuit diagram showing a configuration example of a current controller in the switching power supply device shown in FIG. 5.

Moreover, the switching power supply device of the present embodiment is configured as the step-up DC-DC converter which supplies to the load 110 a predetermined voltage higher than the input voltage VIN but may be configured as a step-down DC-DC converter which supplies to the load 110 a predetermined voltage lower than the input voltage VIN. Moreover, the present invention is applicable to the flyback switching power supply using the transformer, which is shown in the conventional example of FIG. 5, and the present invention is not limited by the configuration of the switching power supply.

Figure 4:
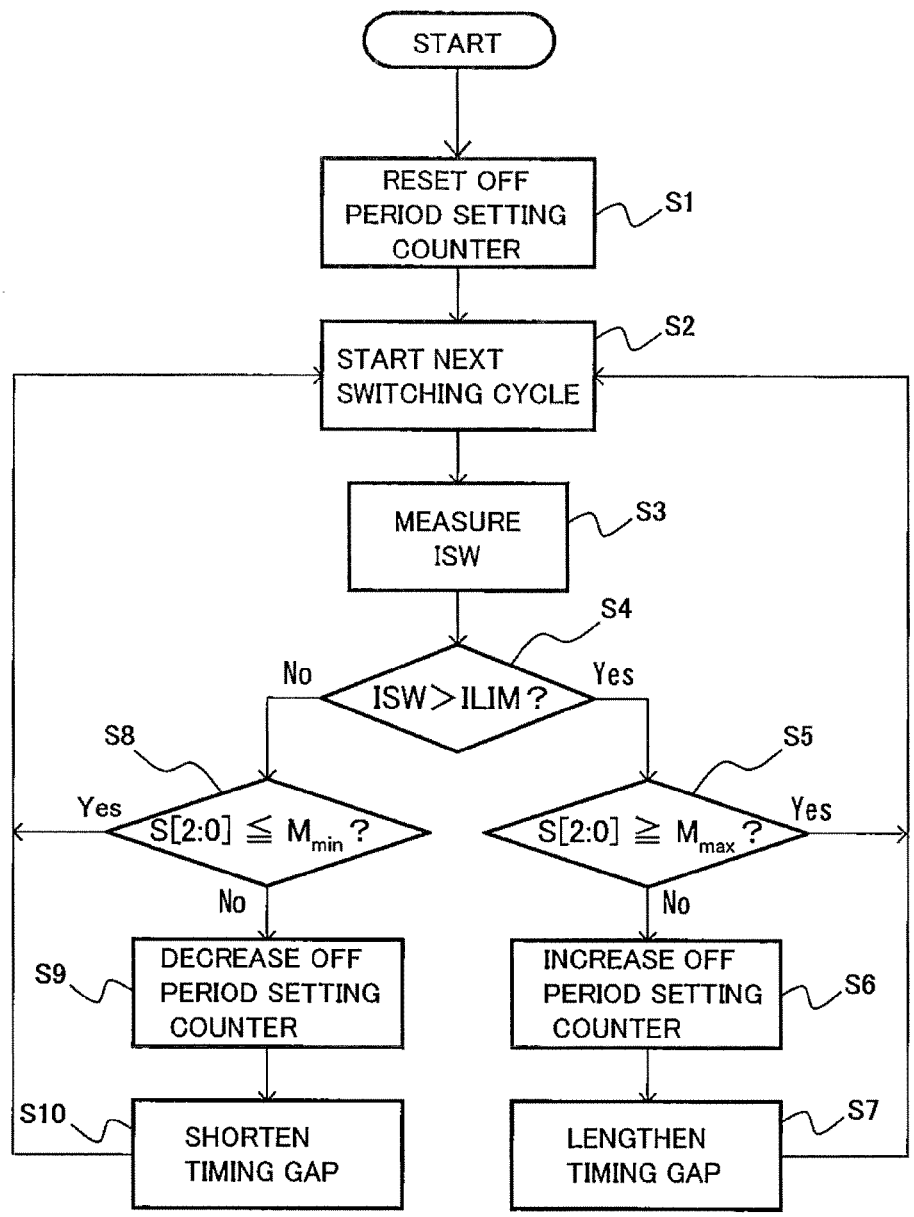
FIG. 4 is a flow chart showing operations of the switching power supply device shown in FIG. 1.

FIG. 4 is a flow chart showing the operations of the switching power supply device of FIG. 1. As an initial setting, the OFF period setting counter 180 is being reset (Step S1). The switching cycle (PWM cycle) starts, and the switching element 100 is turned ON (Step S2). Then, the PWM controller 150 measures, through the current detector 140, the switch current ISW at the time of the termination of the blanking period in this switching cycle (Step S3). The PWM controller 150 determines whether or not the magnitude of the switch current ISW (the voltage value of the current detection signal IDET corresponding to the switch current ISW) is a threshold ILIM (current limitation voltage VTH corresponding to the threshold ILIM) or more (Step S4). As a result, in a case where it is determined that the switch current ISW is higher than the threshold ILIM, that is, the current is the overcurrent state (Yes in Step S4), and the value of the counter output S[2:0] of the OFF period setting counter 180 is smaller than an upper limit Mmax (No in Step S5), the PWM controller 150 increases the value of the counter output S[2:0] of the OFF period setting counter 180 (Step S6). The PWM controller 150 increases the OFF period of the switching element 100 in accordance with the increased value of the counter output S[2:0] of the OFF period setting counter 180 (Step S7). In contrast, in a case where the switch current ISW is smaller than the threshold ILIM (No in Step S4), and the value of the counter output S[2:0] of the OFF period setting counter 180 is larger than a lower limit Mmin (No in Step S8), the PWM controller 150 decreases the value of the counter output S[2:0] of the OFF period setting counter 180 (Step S9). Further, the PWM controller 150 decreases the OFF period of the switching element 100 in accordance with the decreased value of the counter output S[2:0] of the OFF period setting counter 180 (Step S10). In the example shown in FIG. 3, the upper limit Mmax of the OFF period setting counter is 7, and the lower limit Mmin thereof is 0.

As above, in accordance with the present embodiment, the drive signal GATE of the switching element 100 is generated so as to lengthen the ON timing interval Tg of the switching element 100 as the number of times the comparator 160 determines that the current is the overcurrent state increases and to shorten the ON timing interval Tg of the switching element 100 as the number of times the comparator 160 determines that the state is not the overcurrent state increases. As above, the delay time (timing interval Tg) of the switching is dynamically controlled in accordance with the history of the overcurrent detection. With this, the overcurrent can be surely and easily suppressed with respect to a wide range of load conditions and variable conditions. Further, the overcurrent can be surely suppressed even in the case of securing the long blanking period for preventing the malfunctions caused due to the spike noise generated at the time of switching. Therefore, the system can be easily stabilized.

The foregoing has explained the embodiment of the present invention. However, the present invention is not limited to the above embodiment, and various improvements, changes, and modifications may be made within the spirit of the present invention. For example, the above embodiment has explained a case where the overcurrent protection circuit is applied to the switching power supply device. However, the above embodiment is not limited to this as long as the switching power supply device is a switching control device capable of performing switching control using a switching element. For example, the present invention is applicable to the switching control devices, such as motor driving devices and actuator driving devices. Specifically, the present invention is applicable to, for example, a device, shown in respective drawings of Japanese Patent No. 3672866, configured to perform a control operation of changing a current value of an armature depending on the position of a motor rotor by detecting a current by using a current detecting circuit constituted by a shunt resistor.

The present invention is useful to surely and easily suppress the overcurrent flowing through the switching element over a wide load current range in the overcurrent protection circuit used in the switching control device.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

What is claimed is:

1. An overcurrent protection circuit comprising:
a switching element configured to adjust electric power by switching control, the electric power being supplied to a load;
a current detector configured to detect a switch current flowing through the switching element; and
a controller configured to perform the switching control of the switching element based on the switch current detected by the current detector, wherein:
the controller includes: a determiner configured to determine whether or not the switch current exceeds a predetermined threshold, that is, the switch current is an overcurrent state when the switching element is turned ON; an OFF period setting counter configured to increase or decrease a counter output depending on a determination result of the determiner; and a drive signal generator configured to generate a drive signal of the switching element such that a length of an ON timing interval of the switching element corresponds to the counter output of the OFF period setting counter,
the OFF period setting counter is configured to count up the counter output when the determiner determines that the switch current is the overcurrent state and count down the counter output when the determiner determines that the switch current is not the overcurrent state, and
counting down the counter output per determination that the switch current is not the overcurrent state includes two or more steps of counting down from a current value to a base value.

2. The overcurrent protection circuit according to claim 1, wherein the determiner determines by using the switch current flowing when a predetermined first period has passed since the switching element was turned ON.

3. The overcurrent protection circuit according to claim 2, wherein:
the drive signal generator generates the drive signal designed such that the switching element is not turned OFF regardless of the determination result of the determiner until a predetermined second period passes since the switching element is turned ON; and the first period is set based on the second period.

4. The overcurrent protection circuit according to claim 1, wherein the drive signal generator is configured to lengthen the ON timing interval of the switching element as a value of the counter output increases and shorten the ON timing interval of the switching element as the value of the counter output decreases.

5. The overcurrent protection circuit according to claim 1, wherein the drive signal generator generates a pulse width modulation signal based on an output voltage and generates the drive signal designed such that the ON timing interval of the switching element becomes the same in length as a cycle or cycles of the pulse width modulation signal, the number of cycles corresponding to a value of the counter output of the OFF period setting counter.

6. The overcurrent protection circuit according to claim 1, wherein the drive signal generator is configured such that the ON timing interval of the switching element changes at an accelerated rate with respect to an increase/decrease range of a value of the counter output of the OFF period setting counter.

7. The overcurrent protection circuit according to claim 1, wherein the determiner changes the threshold with time.

8. An overcurrent protection method applied to a switching control device configured to supply electric power to a load, comprising the steps of:
(i) when a switching element configured to adjust, by switching control, the electric power supplied to the load is turned ON, determining whether or not a switch current flowing through the switching element exceeds a predetermined threshold, that is, the current is an overcurrent state;
(ii) increasing or decreasing a counter output depending on a determination result of the step (i); and
(iii) depending on an increase or decrease of the counter output, determining a period in which the switching element is OFF, wherein:
when it is determined that the switch current is the overcurrent state, the counter output is increased and when it is determined that the switch current is not the overcurrent state, the counter output is decreased, and
counting down the counter output per determination that the switch current is not the overcurrent state includes two or more steps of counting down from a current value to a base value.

9. The overcurrent protection method according to claim 8, wherein the step (i) determines by using the switch current flowing when a predetermined first period has passed since the switching element was turned ON.

10. The overcurrent protection method according to claim 8, wherein the step (iii) includes a step (iv) of generating a drive signal of the switching element, the drive signal being designed such that an ON timing interval of the switching element is lengthened as the number of times it is determined that the current is the overcurrent state increases.

11. The overcurrent protection method according to claim 10, wherein in the step (iv), the ON timing interval is changed at an accelerated rate as the number of times it is determined that the current is the overcurrent state increases.

12. An overcurrent protection circuit comprising:
an output terminal and a feedback terminal externally connectable each other;
a drive signal generator configured to generate a drive signal, the drive signal generator including a PWM signal generator for generating a PWM signal internally within the drive signal generator, the PWM signal generator having an input connected to the feedback terminal and a reference voltage generator;
a switching transistor having a node connected to the output terminal and a gate connected to the drive signal generator to receive the drive signal;
a mask signal generator configured to generate a mask signal if an overcurrent condition occurred; and
a counter for counting successive overcurrent condition, wherein:
the drive signal generator further includes a logic gate, the logic gate having an input connected the PWM signal generator and the mask signal generator, and
the mask signal is generated in consideration of a counting result of the counter.

13. The overcurrent protection circuit according to claim 12, further comprising:
an overcurrent detector configured to detect the overcurrent condition in each switching cycle.

14. The overcurrent protection circuit according to claim 12, further comprising:
an overcurrent detector having a sensor and a comparator, wherein the comparator compares an output of the sensor and a threshold value and detects the overcurrent condition if the output of the sensor exceeds the threshold value.

15. The overcurrent protection circuit according to claim 12, wherein
the switching transistor becomes OFF state if the mask signal generated by the mask signal generator is active.

16. The overcurrent protection circuit according to claim 12, wherein
the mask signal generator generates the mask signal so as to increase an OFF period of the switching transistor when the counting result of the counter increases.

17. The overcurrent protection circuit according to claim 12, wherein
the counter decreases the counting result if the overcurrent condition is not detected.

18. The overcurrent protection circuit according to claim 12, wherein
the maximum count number of the counter is seven.

19. The overcurrent protection circuit according to claim 12, wherein
counting down the counter output includes two or more steps of counting down.

20. An overcurrent protection circuit comprising:
A first terminal and a second terminal;
a drive signal generator configured to generate a drive signal, the drive signal generator including a PWM signal generator for generating a PWM signal internally within the overcurrent protection circuit, the PWM signal generator having a first input connected to the second terminal and a second input for receiving a reference voltage;
a switching transistor having a node connected to the first terminal and a gate connected to the drive signal generator to receive the drive signal;
a mask signal generator configured to generate a mask signal for masking the PWM signal; and
a counter configured to be counted up if an overcurrent condition occurs, wherein:
the drive signal generator further includes a logic gate, the logic gate having an input connected the PWM signal generator and the mask signal generator, and the mask signal is generated in consideration of a counting result of the counter.

* * * * *